Jan. 10, 1933. P. DUNSHEATH Re. 18,710
EXTRUSION OF METAL PIPES AND THE LIKE
Original Filed June 26, 1930
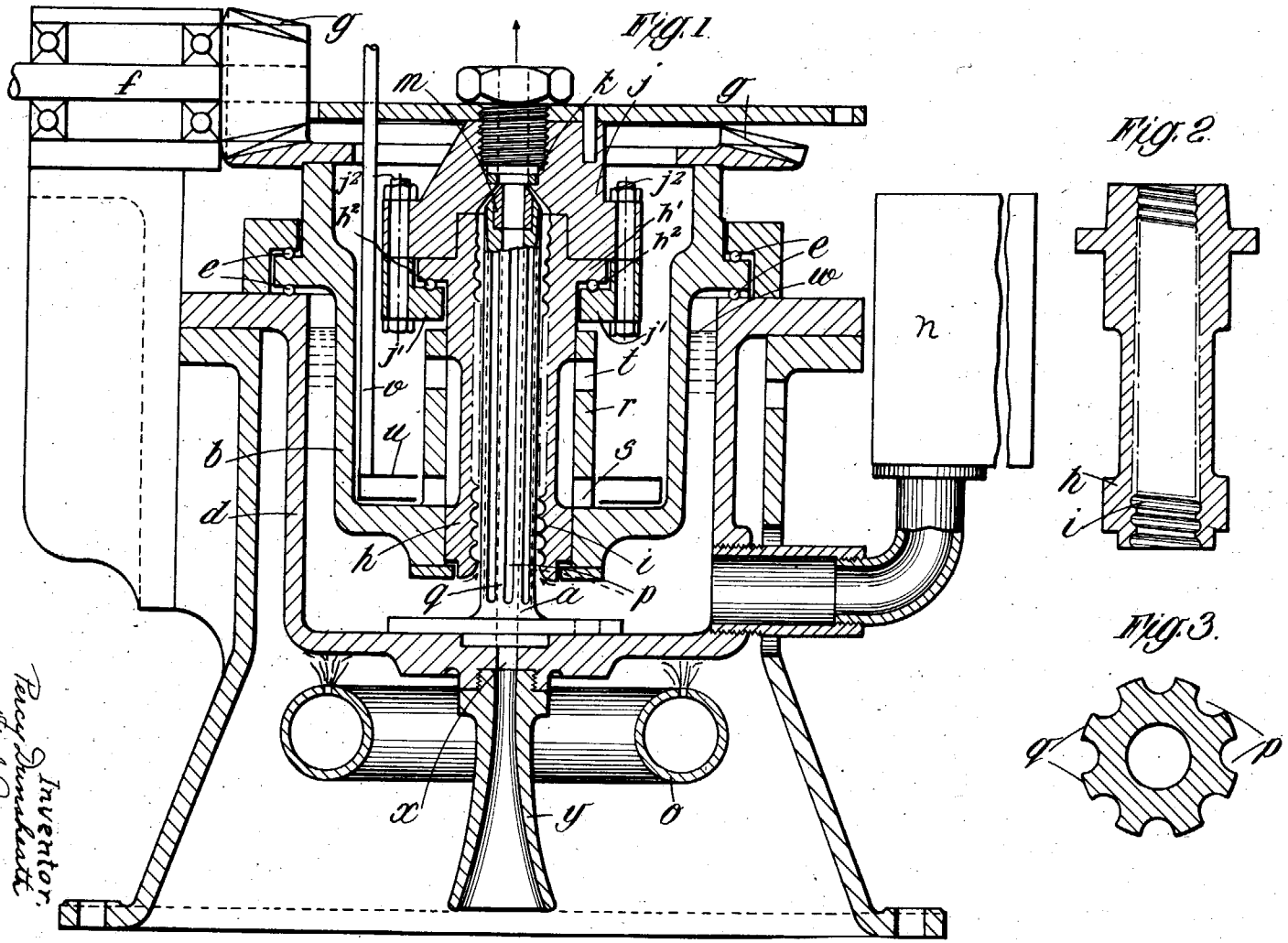
Inventor.
Percy Dunsheath
M. H. Lockwood
Attorney.

Reissued Jan. 10, 1933 Re. 18,710

UNITED STATES PATENT OFFICE

PERCY DUNSHEATH, OF SIDCUP, ENGLAND, ASSIGNOR TO W. T. HENLEY'S TELEGRAPH WORKS COMPANY LIMITED, OF LONDON, ENGLAND

EXTRUSION OF METAL PIPES AND THE LIKE

Original No. 1,817,301, dated August 4, 1931, Serial No. 463,879, filed June 26, 1930, and in Great Britain July 1, 1929. Application for reissue filed October 11, 1932. Serial No. 637,297.

This invention relates to the extrusion of metal pipes and the like and to the application of lead or like sheaths to electric cables. The usual method of producing pipes or cable sheaths of lead and its alloys is to employ a hydraulic press, including a cylinder or container charged with molten lead which, as it cools is forced forward in a semi-molten state through an annular space between a die and a point by the advancement of a ram. In such an apparatus various factors contribute to difficulty in maintaining uniformity of thickness of the sheathing, whilst the very high pressures which have to be employed require correspondingly strong and heavy apparatus; further, owing to the necessity for refilling, the press must be stopped at intervals and the ram withdrawn.

It has been proposed also to use, instead of a ram working in a cylinder, a screw threaded member constituting a point holder or core rotatable within a cylindrical member constituting a casing formed with longitudinal ribs and/or grooves, means being provided for supplying molten lead or lead alloy to said screw thread by which it is extruded, after solidification, in the form of a tube or cable sheath.

According to the present invention either the casing or the point holder or core may be rotatable relatively to the other, and either one of said members may be formed with the screw thread, and the other with the longitudinal ribs and/or grooves, whilst in order to produce a smooth exterior and interior surface on the mass of metal without the formation of fissures and folds therein, the screw thread on one member and the ribs and/or grooves on the other member die away toward the outlet end, the former dying away before the latter.

It is desirable that a small clearance should be left between the two relatively rotatable members, whilst, where required, a suitable shaping die may be provided at the outlet end of the apparatus.

Where a cable is to be sheathed by the apparatus, the point holder forms a tube through which the cable is fed so that as it passes out through a die, it is surrounded by the extruded metal.

Preferably, means are provided for cooling the outer of the two relatively rotatable concentric members beyond that part thereof where the molten metal enters it.

In order to prevent relative rotation between the metal and the walls of the passage through which it passes beyond the screw threaded member said walls are constituted by the ribbed and/or grooved member, or a part mounted thereon, on the one hand, and by a member in extension of the screw threaded member, on the other hand, said extension member being stationary or rotary according as said screw threaded member is rotary or stationary, whilst the ribs and/or grooves do not die away completely until after they have passed the junction between the screw threaded member and its extension.

The continuous movement of the metal in the narrow annular space between the relatively rotatable concentric members makes it an easy matter to obtain accurate temperature measurements of the metal at different points in the length of the passage, and accurately to control the temperature gradient in the metal, so that the metal which enters in the molten state can be made, by appropriate control of the cooling, to change from the liquid to the solid state as it travels forward.

One form of apparatus for carrying the invention into effect is shown by the accompanying drawing in which Figure 1 is a sectional elevation; Figure 2 a section of a modified detail and Figure 3 an enlarged cross-section of the core or point holder.

As illustrated a central hollow point holder *a* is fixed centrally in a vertical position with respect to a vessel *b* which is surrounded by a cylindrical casing *d* on which casing said vessel is rotatably mounted in ball bearings *e* and adapted to be driven by a shaft *f* through bevel wheels *g g*. The casing *b* carries a coaxial driving sleeve *h* formed at its inner surface with a screw thread *i* which dies away at the outlet end of said sleeve which is located within a stationary member *j* carrying a die *k* mounted in close proximity to the point $m$ supported by the point holder $a$.

In order that the tensile force generated in the apparatus and tending to separate the outer member or casing and the shaping die, as a result of the compressive forces in the metal under extrusion, may be resisted in the locality of the die without change in the general direction of the flow of the metal, the outer member $h$ is formed near its outlet end with a flange $h'$ received in a groove formed between the stationary member $j$ and the internal flange of an L-section ring $j'$ which is secured to said member $j$ by means of bolts $j^2$, the thrust of said flange $h'$ being taken by the ring $j'$ through the medium of a ball bearing $h^2$.

The lower end of the vessel $b$ is submerged in molten metal contained in the casing $d$ which is supplied from a tank $n$ (heated by means not shown), whilst a gas burner $o$ or other heating means is provided for maintaining the temperature of the lead in the casing $d$.

The arrangements are such that the vessel $b$ is adapted to be rotated round the point holder $a$, its bearings being arranged at a part remote from the hot part in contact with the lead and ensuring true concentricity of the die $k$ and the point $m$. The outer surface of the point holder $a$ is formed with longitudinal grooves $p$ leaving ridges $q$ (see Figure 3) said grooves dying out toward the upper end, beyond the upper end of the driving sleeve $h$, their function being to prevent the general mass of metal enclosed between the driving sleeve $h$ and the point holder $a$ from being carried round bodily by said sleeve. The temperature gradient along the apparatus is controlled by cooling devices such as water or oil circulating pipes, appropriately disposed, or by air blown thereinto for which latter purpose a coaxial flange $r$ in the vessel $b$ is apertured as at $s$ $t$ and an annular channel $u$ opening opposite the apertures $s$ is supplied with air (which may be cooled) through a pipe $v$, the air passing through the apertures $s$ into contact with the outer wall of the driving sleeve $h$ and passing away through the apertures $t$.

The molten metal flows from the tank $n$ to the casing $d$ to approximately the level indicated at $w$ and on entering the lower end of the space between the driving sleeve $h$ and the point holder $a$ is fed upwards by gravity until it has solidified and thereafter by the action of the internal screw thread $i$ as the vessel $b$ and driving sleeve $h$ are rotated. In the lower part of the sleeve $h$ the drive exerated by the screw thread $i$ is loose owing to the fluid state of the lead, but as the latter becomes solid, the drive becomes effective, and the thread $i$ exerts the pressure necessary to force the metal between the die $k$ and the point $m$. In the upper part of the sleeve $h$ where the metal is coolest, the thread $i$ dies away and is succeeded by the smooth surface of the stationary part $j$ which tapers towards the die $k$ so as to smooth out any traces of marks (if any) left by the thread $i$ and ensure uniformity of the finished product. For a similar reason the grooves $p$ die away before the point $m$ is reached, but after the screw thread $i$ has died away, i. e. after the lead stream has reached the stationary part $j$.

The inner surface of the stationary part $j$ may be as indicated in Figure 1, or in some cases its lower part may be cylindrical until the grooves $p$ have died away to prevent any risk of folding of the lead. By suitable selection of the pitch and the rate of reduction of the size of the thread $i$, of the area of cross-section of the lead stream between the sleeve $h$ and the point holder $a$ and of the temperature gradient, the pressure required for the extrusion of the metal can be obtained.

Instead of forming the sleeve $h$ with screw thread $i$ which dies away at its upper end only, by cutting away the tops of the thread, it may die away by cutting a tapered thread throughout the whole length of the sleeve and then boring its cylindrically, as in Figure 2, or part may be as in Figure 1 and part tapered as in Figure 2.

It is desirable that the temperature of the molten metal just before it enters the space between the sleeve $h$ and point holder $a$ should be just above (say 5° to 10° F.) the melting point of the metal so as to ensure solidification of the metal as soon as possible after it has entered said space.

When the apparatus is to be employed for sheathing electric cables or the like, the point holder $a$ is hollow and fitted over an aperture $x$ in the bottom of the casing $d$ to the under-surface of which is secured a suitable guide such as is shown at $y$.

The above description refers to apparatus in which the centrally grooved point holder is fixed in a vertical position and is surrounded by an internally threaded cylindrical rotatable casing, but it is to be understood that this holder may be fixed in a horizontal position, and the casing may be mounted so as to rotate on a horizontal axis, whilst means are provided for feeding molten metal into one end of the space between said point holder and said casing.

I claim:—

1. Means for the continuous extrusion of metal pipes and the like, comprising two relatively rotatable concentric members the inner one of which forms a point holder or core and the outer one of which forms a casing, one of said members being formed with a screw thread and the other with longitudinal ribs and/or grooves, means being provided for supplying molten lead or lead alloy to said screw thread by which it is extruded after solidification in the form of a tube or cable sheath, in which the screw thread on one member and the ribs and/or grooves on the other member die away toward the outlet end, the former dying away before the latter, in order to produce a smooth exterior and interior surface on the mass of metal without the formation of fissures and folds in the metal.

2. Means for the continuous extrusion of metal pipes or the like as claimed in claim 1, in which a central grooved point holder is fixed in a vertical position and is surrounded by an internally threaded cylindrical rotatable casing, mounted so as to rotate on a vertical axis, while the lower portion is submerged in molten metal.

3. Means for the continuous extrusion of metal pipes and the like, comprising two relatively rotatable concentric members, the inner one of which forms a point holder or core and the outer one of which forms a casing, one of said members being formed with a screw thread and the other with longitudinal ribs and/or grooves, means being provided for supplying molten lead or lead alloy to said screw thread by which it is extruded after solidification in the form of a tube or cable sheath, in which the metal passes through three distinct zones in the apparatus, the first of which is an impelling zone where there is little or no diminution in the depth of the screw thread or grooves, the second of which is still within the space between the relatively rotatable concentric members where the screw thread on one member dies away, but through which the ribs and/or grooves on the other member continue, and the third of which is bounded, on the one hand, by the continuation of the member on which the ribs and/or grooves die away, and, on the other hand, by a smooth surface on a member which is stationary or rotary according as said last mentioned member is stationary or rotary in order to produce a smooth exterior and interior surface on the mass of metal without the formation of fissures and folds in the metal.

4. Means for the continuous extrusion of metal pipes or the like as claimed in claim 1, in which a central grooved point holder in fixed position is surrounded by an internally threaded cylindrical rotatable casing, mounted so as to rotate concentrically of said point holder, while means are provided for feeding molten metal into one end of the space between said point holder and said casing.

5. Means for continuous extrusion of metal pipes and the like, comprising two relatively rotatable concentric members the inner one of which forms a point holder or core and the outer one of which forms a casing, said outer member being formed with a screw thread and said inner member with longitudinal ribs and/or grooves, means being provided for supplying molten lead or lead alloy to said screw thread by which it is extruded, after solidification, in the form of a tube or cable sheath, a suitable shaping die being secured to the adjacent end of said outer member or casing in such manner as to permit relative rotation therebetween and so that the tensile force generated in the apparatus and tending to separate the outer member or casing and the shaping die, as a result of the compressive forces in the metal under extrusion, are resisted in the locality of said die without change in the general direction of the flow of the metal.

6. Means for the continuous extrusion of metal pipes or the like as claimed in claim 5, in which the screw thread on one member and the ribs and/or grooves on the other member die away toward the outlet end in order to produce a smooth exterior and interior surface on the mass of metal before it reaches the extruding die without the formation of fissures and folds in the metal.

7. Means for the continuous extrusion of metal pipes or the like as claimed in claim 5, in which a central grooved point holder is fixed in a vertical position and is surrounded by an internally threaded cylindrical rotatable casing, mounted so as to rotate on a vertical axis while the lower portion is submerged in molten metal.

8. Means for the continuous extrusion of metal pipes and the like, comprising two relatively rotatable concentric members, the inner one of which forms a point holder or core and the outer one of which forms a casing, said outer member being formed with a screw thread, and said inner member with longitudinal ribs and/or grooves, means being provided for supplying molten lead or lead alloy to said screw thread by which it is extruded after solidification in the form of a tube or cable sheath, a suitable shaping die being secured to the adjacent end of said outer member or casing in such manner as to permit relative rotation therebetween and so that the tensile force generated in the apparatus and tending to separate the outer member or casing and the shaping die, as a result of the compressive forces in the metal under extrusion, are resisted in the locality of said die without change in the general direction of the flow of the metal, there being three distinct zones in the apparatus, the first of which is an impelling zone where there is little or no diminution in the depth of the screw thread or grooves, the second of which is still within the space between the relatively rotatable concentric members where the screw thread on the outer member dies away, but through which the ribs and/or grooves on the inner member continue, and the third of which is a zone bounded, on the one hand, by the continuation of the inner member on which the ribs and/or grooves die away, and, on the other hand, by a smooth surface on a member which is stationary or rotary, according as said inner member is stationary or rotary.

9. Means for the continuous extrusion of metal pipes or the like as claimed in claim 8, in which the internal screw thread on the casing, and the ribs and/or grooves on the point holder, die away towards the outlet end, said point holder being fixed in a vertical position and said casing being mounted so as to rotate on a vertical axis while the lower portion is submerged in molten metal.

PERCY DUNSHEATH.